United States Patent [19]

Amendolia

[11] 4,157,209

[45] Jun. 5, 1979

[54] OPTICAL DEVICE HAVING LIGHT-MIXING ELEMENT

[75] Inventor: Pasquale J. Amendolia, St. James, N.Y.

[73] Assignee: Varilite Corporation, Nesconset, N.Y.

[21] Appl. No.: 908,744

[22] Filed: May 23, 1978

[51] Int. Cl.² ............................ G01F 23/28; G02B 5/14; G08B 5/00
[52] U.S. Cl. ............................ 350/96.16; 73/291; 73/293; 116/202; 250/227; 340/380
[58] Field of Search ............ 73/292, 293, 291; 250/227; 350/96.10, 96.16

[56] References Cited

U.S. PATENT DOCUMENTS

| | | | |
|---|---|---|---|
| 2,740,957 | 4/1956 | Davies | 340/380 |
| 3,439,157 | 4/1969 | Myles | 362/32 |
| 3,492,070 | 1/1970 | Zahn | 355/37 |
| 3,535,018 | 10/1970 | Vasilatos | 362/37 X |
| 3,692,383 | 9/1972 | Herod et al. | 73/292 X |
| 3,901,581 | 8/1975 | Thiel | 350/96.16 |
| 4,092,059 | 5/1978 | Hawkes et al. | 350/96.16 |

*Primary Examiner*—Daniel M. Yasich

*Attorney, Agent, or Firm*—Brumbaugh, Graves, Donohue & Raymond

[57] ABSTRACT

An optical device comprises a pair of contrastingly-colored sources of light, means for adjusting the brightness of the sources of light relative to each other, and a mixing element formed with a light-entrance portion to permit entrance into the mixing element of light emanating from the sources and with a display surface that communicates optically with the entrance portion and facilitates viewing of the light entering the mixing element through the entrance portion and propagated through the mixing element to the display surface, the light as displayed having a color that depends on the relative brightness of the sources. The mixing element has at least in part generally the shape of a cylinder formed with an axial bore so that the mixing element has an outer surface and an inner surface. At least one of the outer and inner surfaces comprises a plurality of axially-extending segments, and at least some of the light emanating from the sources and entering the mixing element through the entrance portion is multiply reflected from the outer and inner surfaces and scattered by the axially-extending segments, whereby thorough mixing of the light in the mixing element and display is achieved.

23 Claims, 10 Drawing Figures

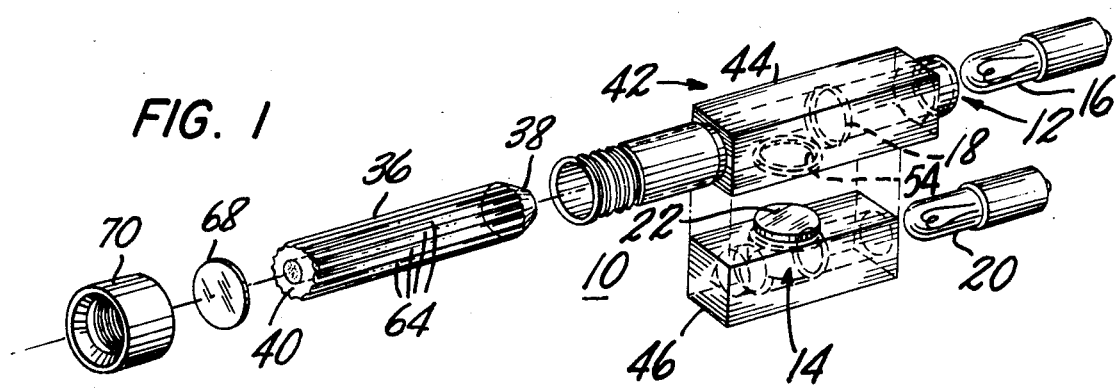
FIG. 1
FIG. 2
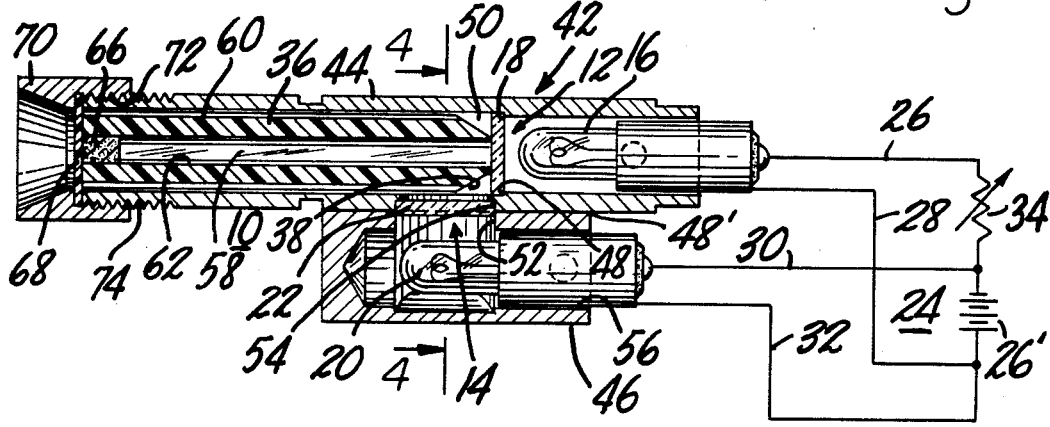
FIG. 3
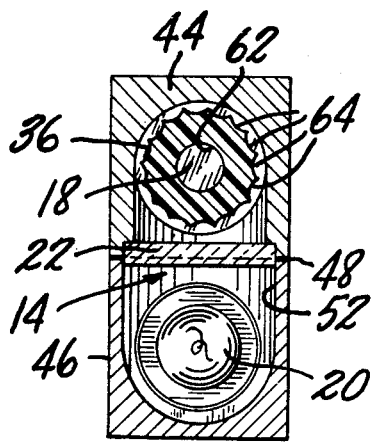
FIG. 4
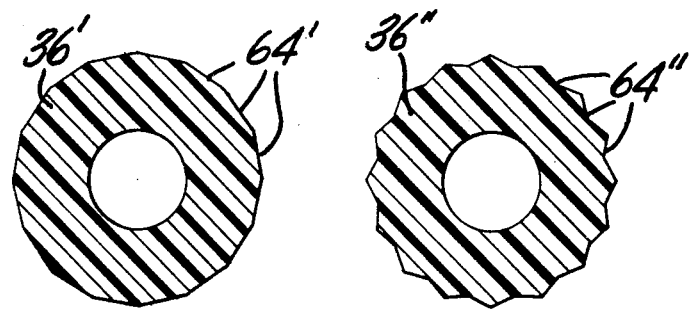
FIG. 5    FIG. 6

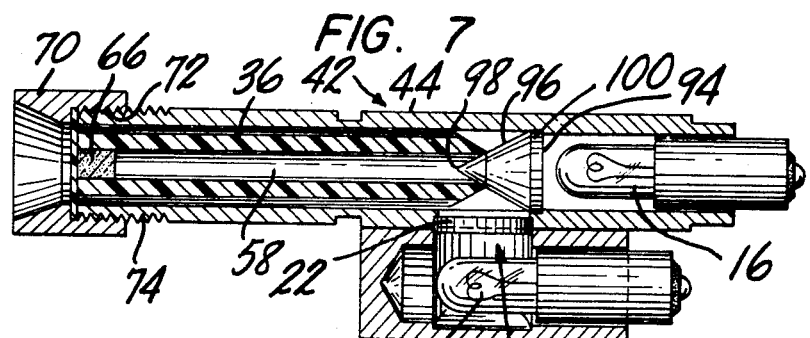
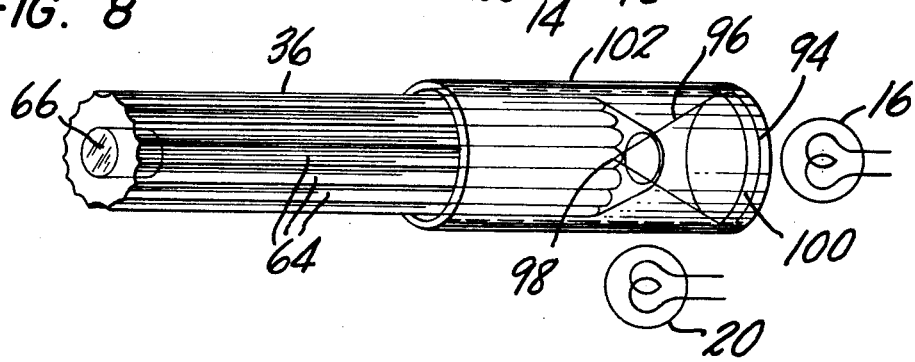
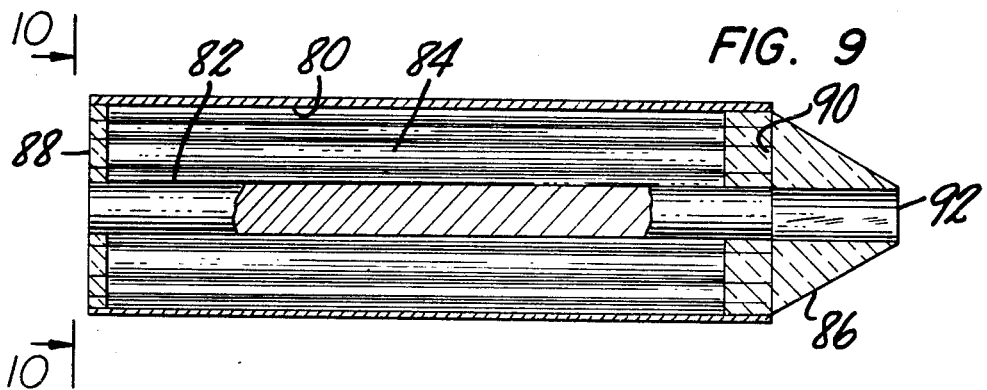
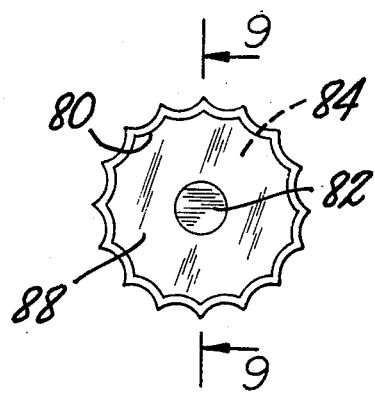

OPTICAL DEVICE HAVING LIGHT-MIXING ELEMENT

BACKGROUND OF THE INVENTION

This invention relates to optical devices and, more particularly, to a novel and highly-effective optical device for mixing and displaying light emanating from a plurality of contrastingly-colored sources.

In my U.S. Pat. No. 3,648,521, issued Mar. 14, 1972, for "Light Indicator", I disclose a device comprising a pair of contrastingly-colored light sources, means for varying the relative intensity of the sources, and a mixing element formed with a display surface. The light from the two sources is mixed by the mixing element and displayed on the display surface. The device has many applications, including indicating by the color of the displayed light the depth or level of an explosive fluid such as a fuel for a jet airplane or space vehicle.

SUMMARY OF THE INVENTION

An object of the present invention is to make a further improvement in the state of the art relating to devices of the type disclosed in my earlier patent identified above. In particular, an object of the invention is to provide a device which, as compared to devices of the prior art, is smaller or more compact yet achieves better or more thorough mixing of the light from two or more sources, whereby the display is made more uniform and easier to interpret.

The foregoing and other objects are attained in an optical device comprising at least two contrastingly-colored sources of light, means for adjusting the brightness of the sources of light relative to each other, and a novel mixing element. The mixing element is formed with a light-entrance portion to permit entrance into the mixing element of light emanating from the sources and with a display surface that communicates optically with the entrance portion and facilitates viewing of a display of the light entering the mixing element through the entrance portion and propagated through the mixing element to the display surface. The light as displayed has a color that depends on the relative brightness of the sources.

In accordance with the invention, the mixing element has at least in part generally the shape of a cylinder formed with an axial bore so that the mixing element has an outer surface and an inner surface, at least one of the outer and inner surfaces comprising a plurality of axially-extending segments. At least some of the light emanating from the sources and entering the mixing element through the entrance portion is multiply reflected from the outer and inner surfaces and scattered by the axially-extending segments. In this manner, thorough mixing of the light in the mixing element and display is achieved.

In combination with the features described above, the invention in its preferred embodiments is characterized by a number of additional features that contribute to its efficient operation. Thus at least some of the axially-extending segments are substantially V-shaped in cross section or U-shaped in cross section or are substantially flat. The number of axially-extending segments is preferably about 16. The mixing element may be made of a substantially transparent plastic or, in a large device where high power may be employed and a considerable amount of heat generated, the outer and inner surfaces may be metallic and highly polished, and a vacuum may be maintained between the outer and inner surfaces, or the space between those surfaces may be air-filled or liquid-filled. In such a case, the entrance portion and the display surface may be made at least partly of glass, in order better to withstand the high temperature.

The entrance portion preferably has at least in part generally the shape of a cone frustum having a large base coterminous with the generally-cylindrical portion of the mixing element and a small base lying on an axial extension of the generally-cylindrical portion of the mixing element. The included angle of the cone frustum is substantially 60°. A plug preferably fills at least a part of the bore of the mixing element, and the plug may be opaque or may be substantially transparent to light emanating from one of the light sources and substantially opaque to light emanating from the other of the lihgt sources. The display surface preferably has a light-diffusing finish.

Each of the light sources may comprise a lamp and a filter optically interposed between the lamp and the entrance portion of the mixing element. One lamp-filter combination then lies on an extension of the axis of the mixing element, and the other is displaced from the axis. In some embodiments, both may be displaced from the axis. Both of the filters may be substantially disc-shaped, or only the filter lying on an extension of the axis of the cylinder may be substantially disc-shaped, and the other filter may be substantially cylindrical and coaxial with the mixing element.

The filter lying on an extension of the axis may substantially abut the mixing element, or it may be spaced apart from the mixing element, and a transparent conical guide may be interposed between the mixing element and the filter lying on an extension of the axis of the mixing element. In the latter case, the conical guide preferably has a vertex inserted into the bore of the mixing element and a base substantially abutting the filter lying on an extension of the axis of the mixing element.

Preferably a hood is mounted in such a manner as to reduce the ambient light striking the display surface.

BRIEF DESCRIPTION OF THE DRAWING

A better understanding of the invention, including additional objects thereof, may be gained from a consideration of the following detailed description of the preferred embodiments thereof, in conjunction with the appended figures of the drawing, wherein:

FIG. 1 is an exploded perspective view of a device representing the best mode now contemplated for practicing the invention;

FIG. 2 is an assembled view, from a different perspective, of the device of FIG. 1;

FIG. 3 is a sectional view taken along the line 3—3 of FIG. 2 and looking in the direction of the arrows, further showing representative electrical circuitry connected in accordance with the invention;

FIG. 4 is a sectional view taken along the line 4—4 of FIG. 3 and looking in the direction of the arrows;

FIGS. 5 and 6 are sectional views corresponding to FIG. 4 but on a larg..r scale and showing, respectively, modified embodiments of a portion of the apparatus shown in FIG. 4;

FIG. 7 is a sectional view similar to FIG. 3 showing another representative embodiment of the invention;

FIG. 8 is a fragmentary perspective view corresponding to FIG. 7 but showing a further modification of the apparatus of FIG. 7;

FIG. 9 is a longitudinal sectional view taken along the line 9—9 of FIG. 10, looking in the direction of the arrows, and showing another embodiment of a portion of apparatus in accordance with the invention; and FIG. 10 is a view in elevation taken along line 10—10 of FIG. 9.

DESCRIPTION OF THE PREFERRED EMBODIMENTS

FIGS. 1-3 show a preferred embodiment of apparatus 10 constructed in accordance with the invention. The apparatus comprises a pair of contrastingly-colored sources of light 12 and 14. While only two such sources are shown, it is within the scope of the invention to employ additional sources. In particular, three such sources having an additive-primary-color relationship to one another may be employed where it is desired to be able to produce a display having any color of the spectrum.

The source 12 comprises a lamp 16 and a filter 18. Typically, the lamp will emit a light that is nearly white, and the filter 18 will be selected to pass wavelengths in a narrow region of the spectrum, such as the green region, and block other wavelengths.

Similarly, the source 14 comprises a lamp 20, which may be identical to the lamp 16, and a filter 22 having a color, such as red, that contrasts with the color of the filter 18: i.e., the filter 22 passes red light and blocks other light.

As FIG. 3 shows, the device 10 includes means 24 for adjusting the brightness of the sources 12 and 14 relative to each other. This adjusting means as shown in FIG. 3 comprises a battery 26' connected directly to the light 16 through leads 26 and 28. The battery 26 is connected to the light 20 through leads 30 and 32. A variable resistor 34 is included in the lead 26. The resistor 34 has a resistance that varies in response to some condition to be monitored, such as temperature or pressure. Transducers for generating signals for such purposes are well known and need not be described in detail.

While both of the sources of light 12 and 14 are represented as artificial and as physically incorporated in the device 10, it is within the scope of the invention to employ sunlight or other ambient light, possibly in combination with a filter incorporated in the device, as one of the light sources. Similarly, where the device is to function as a pyrometer, the flame in a jet engine or furnace, again possibly in combination with a filter, may serve as one of the light sources.

As FIG. 3 shows, the means for adjusting the brightness of the sources 12 and 14 relative to each other need not adjust the absolute brightness of both sources; the brightness of the sources relative to each other is inherently adjusted if the absolute brightness of only one of the sources is adjusted, as shown in FIG. 3. Of course, it is also within the scope of the invention to adjust the absolute brightness of both sources. Moreover, what is of interest for purposes of the invention is the relative brightness of the sources as displayed in a manner described below. It is thus within the scope of the invention to vary the brightness of the sources as displayed by, for example, modifying the manner in which light is transmitted through a mixing element 36 described in detail below, without adjusting the variable resistor 34.

The mixing element 36 is formed with a light-entrance portion 38 to permit entrance into the mixing element 36 of light emanating from the sources 12 and 14 and with a display surface 40 that communicates optically with the entrance portion 38 and facilitates viewing of a display of the light entering the mixing element 36 through the entrance portion 38 and propagated through the mixing element 36 to the display surface 40.

The lamps 16, 20, filters 18, 22, and mixing element 36 are mounted within a housing 42 preferably made of a light, strong metal such as aluminum. The housing 42 comprises a first section 44 and a second section 46 held together by cement along their junction plane 48'. The filter 18 abuts a shoulder 48 in a bore 50 formed in the housing section 44, and the filter 22 is mounted in a transverse bore 52 formed in the housing section 46 and received in an aperture 54 formed in the housing section 44. The lamp 16 is mounted in the bore 50 of the housing section 44 immediately behind the filter 18, and the lamp 20 is mounted in a longitudinal bore 56 formed in the housing section 46 and immediately behind the filter 22. The entrance portion 38 of the mixing element 36 is immediately adjacent to both light sources and is formed with an axial bore 58 so that the mixing element 36 has an outer surface 60 and an inner surface 62. One of these surfaces, preferably the outer surface 60, is formed with axially-extending segments 64 shown in perspective in FIG. 1. The segments are substantially U-shaped in cross section, as FIG. 4 shows. FIGS. 5 and 6 show on a larger scale a mixing element 36' and a mixing element 36", respectively. In the former, axially-extending segments 64' are substantially flat; in the latter, axially-extending segments 64" are substantially V-shaped in cross section. In all embodiments of the mixing element, at least some of the light propagated therethrough from the entrance portion to the display surface is multiply reflected from the outer and inner surfaces 60 and 62, whereby thorough mixing of the light in the mixing element and display is achieved. As FIGS. 5 and 6 show, the number of axially-extending segments is preferably substantially 16.

In the embodiments described above, the mixing element is made of plastic and substantially transparent. A transparent plug 66, preferably of the same color as one of the light sources (for example, red) fills at least part of the bore of the mixing element. Thus regardless of the relative brightness of the light sources 12 and 14, and hence regardless of the color of the display of light on the display surface 40, the color of the plug 66 will be the same as the color emanating from one of the light sources. This provides a visual check that the apparatus is functioning properly and specifically that the light representing the "base" color (for example, the color displayed under a dangerous condition) has not gone out. Thus one can immediately verify that a "safe" indication is not being given falsely.

A clear plastic retainer disc 68 fits over the end of the mixing element 36 in contact with the display surface 40. A hood 70 is formed with interior threads 72 that engage exterior threads 74 formed on the housing section 44. In this manner, the hood 70 can be screwed onto the housing section 44 to hold the disc 68 and mixing element 36 within the bore 50. The hood 70 reduces the ambient light striking the display surface 40.

As previously noted, in the embodiments discussed above the mixing element is made of a substantially transparent plastic. In the embodiment of FIGS. 9 and 10, the outer reflective surface 80 and the inner reflective surface 82 are metallic and highly polished. In the space 84 between the outer and inner reflective surfaces, a vacuum may be maintained, or the space 84 may be air-filled or liquid-filled. The entrance portion 86 and display surface 88 are made of glass or at least partly of glass. The embodiment of FIGS. 9 and 10 is particularly adapted for use where large amounts of power are used and hence considerable heat is generated. Such a use might be, for example, in flood lights or spot lights. In such a case, the display as viewed would be on a wall, floor or screen, and the surface 88 is a display surface not in the sense that a viewer normally looks at it but in the sense that it facilitates viewing of a display of light (i.e., the light passes through the glass 88 en route to the wall, floor, or screen, etc., which is actually viewed by the public).

In all of the embodiments of the invention, the entrance portion through which the light enters the mixing element has at least in part generally the shape of a cone frustum having a large base (for example, base 90 in FIG. 9) coterminous with the generally cylindrical portion of the mixing element and a small base (92 in FIG. 9) lying on an axial extension of the generally-cylindrical portion of the mixing element. The included angle of the cone frustum is substantially 60°. In the embodiment of FIGS. 9 and 10, the plug filling the bore of the mixing element is opaque. That is, the "bore" is solid, and the mixing element of FIGS. 9 and 10 is to the plastic embodiments of the mixing element as a photographic negative is to a photographic positive.

In the embodiments of FIGS. 7 and 8, the filter 94 lying on an extension of the axis of the mixing element is spaced apart from the mixing element, and a transparent conical guide 96 is interposed between the mixing element and the filter 94. The conical guide 96 has a vertex 98 inserted into the bore of the mixing element and a base 100 substantially abutting the filter 94. In the embodiment of FIG. 8, the filter 102 is substantially cylindrical and coaxial with the mixing element.

Thus there is provided in accordance with the invention a novel and highly-effective optical device that is very compact and inexpensive and yet achieves superior mixing of light from a plurality of sources in a display. A plastic mixing element according to the invention for use in low-power applications may be 2" long overall and have an outside diameter of 3/8" and an inside diameter of 1/8". Without the present invention, the mixing element would have to be many times longer to achieve adequate mixing of light. The device of the invention is thus much better adapted than prior devices of the same general type for incorporation in tape recorders, instrument panels, etc.

Many modifications of the embodiments described above will readily occur to those skilled in the art upon consideration of this disclosure. Accordingly, the invention is to be construed as including all structure that is within the scope of the appended claims, and equivalents thereof.

I claim:
1. In an optical device comprising
   at least two contrastingly-colored sources of light,
   means for adjusting the brightness of said sources of light relative to each other in response to a variable physical condition, and
   a mixing element formed with a light-entrance portion to permit entrance into said mixing element of light emanating from said sources and with a display surface that communicates optically with said entrance portion and facilitates viewing of a display of the light entering said mixing element through said entrance portion and propagated through said mixing element to said display surface, the light as displayed having a color that depends on the relative brightness of said sources, the improvement wherein
   said mixing element has at least in part generally the shape of a cylinder formed with an axial bore so that said mixing element has an outer surface and an inner surface,
   at least one of said outer and inner surfaces comprising a plurality of axially-extending segments, and
   at least some of the light emanating from said sources and entering said mixing element through said entrance portion being multiply reflected from said outer and inner surfaces and scattered by said axially-extending segments,
   whereby thorough mixing of the light in said mixing element and display is achieved, thereby providing an indication of said variable physical condition.

2. An optical device according to claim 1 wherein at least some of said axially-extending segments are substantially V-shaped in cross section.

3. An optical device according to claim 1 wherein at least some of said axially-extending segments are substantially U-shaped in cross section.

4. An optical device according to claim 1 wherein at least some of said axially-extending segments are substantially flat.

5. An optical device according to claim 1 wherein the number of said axially-extending segments is substantially 16.

6. An optical device according to claim 1 wherein said mixing element is made of a substantially transparent plastic.

7. An optical device according to claim 1 wherein said outer and inner surfaces are metallic and highly polished.

8. An optical device according to claim 7 wherein a vacuum is maintained in the space between said outer and inner surfaces.

9. An optical device according to claim 7 wherein the space between said outer and inner surfaces is air-filled.

10. An optical device according to claim 7 wherein the space between said outer and inner surfaces is liquid-filled.

11. An optical device according to claim 7 wherein said entrance portion and said display surface are made at least partly of glass.

12. An optical device according to claim 1 wherein said entrance portion has at least in part generally the shape of a cone frustum having a large base coterminous with the generally-cylindrical portion of said mixing element and a small base lying on an axial extension of the generally-cylindrical portion of said mixing element.

13. An optical device according to claim 12 wherein the included angle of said cone frustum is substantially 60°.

14. An optical device according to claim 1 further comprising a plug filling at least a part of said bore.

15. An optical device according to claim 14 wherein said plug is opaque.

16. An optical device according to claim 14 wherein said plug is substantially transparent to light emanating from one of said sources and substantially opaque to light emanating from the other of said sources.

17. An optical device according to claim 1 wherein said display surface has a light-diffusing.

18. An opticcal device according to claim 1 wherein each of said light sources comprises a lamp and a filter optically interposed between said lamp and said entrance portion, at least one lamp-filter combination being displaced from an extension of the axis of said mixing element.

19. An optical device according to claim 18 wherein both of said filters are substantially disc-shaped.

20. An optical device according to claim 18 wherein the filter displaced from an extension of said axis is substantially cylindrical and coaxial with said mixing element.

21. An optical device according to claim 18 wherein the other filter lies on an extension of said axis and substantially abuts said mixing element.

22. An optical device according to claim 18 wherein the other filter lies on an extension of said axis and is spaced apart from said mixing element, further comprising a transparent conical guide interposed between said mixing element and said filter lying on an extension of said axis, said conical guide having a vertex into said bore and a base substantially abutting said filter lying on an extension of said axis.

23. An optical device according to claim 1 further comprising a hood mounted so as to reduce the ambient light striking said display surface.

* * * * *